June 22, 1965 R. M. WILMOTTE 3,191,044
PHOTOSENSITIVE COUNTER OF THE BINARY SCALER TYPE
Filed Sept. 8, 1959
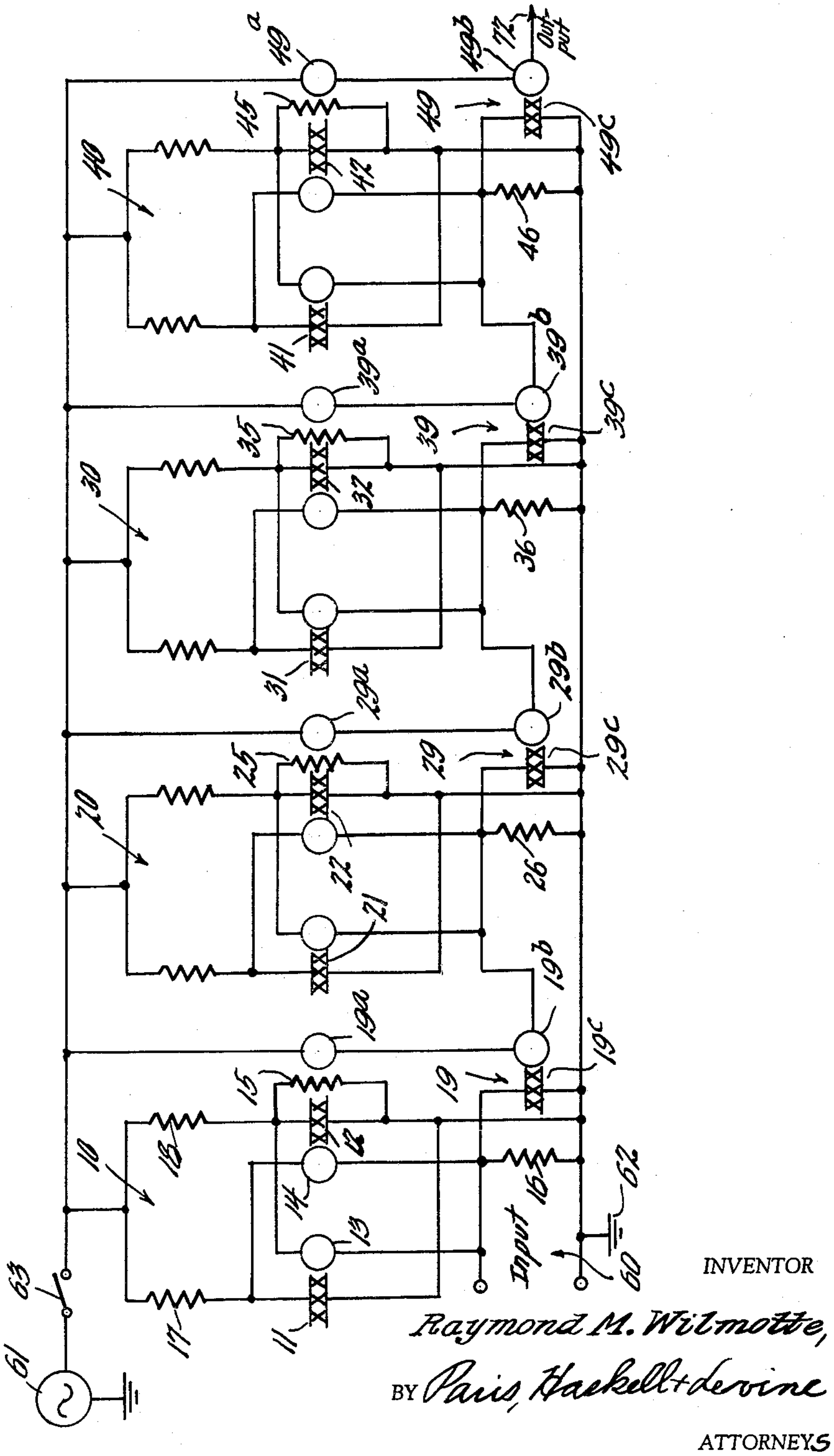
INVENTOR
Raymond M. Wilmotte,
BY Paris, Haskell + Levine
ATTORNEYS United States Patent Office
3,191,044
Patented June 22, 1965

3,191,044
PHOTOSENSITIVE COUNTER OF THE BINARY SCALER TYPE

Raymond M. Wilmotte, Princeton, N.J.
(4301 Massachusetts Ave. NW., Washington, D.C.)
Filed Sept. 8, 1959, Ser. No. 838,452
3 Claims. (Cl. 250—209)

The present invention relates to electrical counter circuits of the binary scaler type, and more particularly is concerned with such circuits wherein the basic components are couples of photoresponsive elements and variable light sources. The present invention is related to my copending application Serial No. 620,831, filed November 7, 1956, and a copending application Serial No. 607,770, filed September 4, 1956, by myself and Robert L. Carnine, jointly.

In their preferred, and what is presently considered their most practical embodiments for the present purposes, the aforementioned couples comprise photoconductors, such as cadmium sulfide crystals, as the photoresponsive elements, and light transmitting electroluminescent condensers, or cells, as the variable light sources. Photoconductors in the form of suitably activated cadmium sulfide crystals are well known, and such elements can be readily formed possessing relatively wide ranges of photo response and time characteristics to illumination. Light transmitting electroluminescent condensers are also well known, and in their more usual form possess the property of emitting light in proportion to the magnitude of A.C. voltage impressed thereacross. These electroluminescent condensers also have the property of a threshold voltage, below which the condensers remain substantially dark or non-luminant.

In accordance with the present invention, by appropriate electrical and luminance coupling of electrical signal responsive variable light sources and photoresponsive elements, such as the types above referred to, circuits can be formed broadly functionally equivalent to conventional counters, such as vacuum tube and magnetic counters.

The present invention being directed to counter circuits of the binary scaler type, it comprises the combination of a plurality of units or stages appropriately interrelated or coupled to perform a logical function, particularly the counting of input signals or pulses on the binary scale. Each of the units or stages includes a flip-flop or scale-of-two circuit formed from two variable light sources and two photoresponsive elements appropriately coupled to said light sources optically and electrically, to impart to the unit or stage two stable states—a "0" state with a first of the light sources luminant and the other non-luminant, and a "1" state with said first light source non-luminant and said other luminant. Each such stage is adapted to be switched from its existing stable state to its other stable state upon the application of each input pulse thereto. Further, appropriate photoresponsive carry circuits are associated with each stage so as to couple any input pulse applied to a given stage to the next succeeding stage when the given stage is in the "1" state at the time said input pulse is applied thereto, but not to couple such input pulse to the next stage when the given stage is in the "0" state. Thus, in accordance with usual binary scaler operation, any pulse applied to the input or first stage of the counter is coupled through all successive stages having a "1" state to the first stage of the counter having a "0" state, and in this process, the input pulse causes each stage through which it is coupled and said first "0" state stage to switch to its other stable state.

It is accordingly one object of the present invention to provide a novel counter circuit.

Another object of the present invention is to provide such a circuit utilizing electric signal responsive variable light sources coupled with photoresponsive elements as the basic components of the circuit.

Another object of the present invention is to provide such a circuit utilizing electroluminescent condensers or cells and photoconductors as the basic components of the circuit.

Still another object of the present invention is to provide a circuit which is broadly functionally equivalent to conventional counters, wherein photoconductors and light transmitting electroluminescent condensers are utilized as the basic components of the circuit.

And an additional object of the present invention is to provide a counter of the binary scaler type, in which the basic elements or components of the circuit are photoresponsive elements and variable light sources electrically and optically coupled together, particularly where said photoresponsive elements are solid state photoconductors, and said light sources are solid state electroluminescent cells or capacitors.

Other objects and advantages of the present invention will become apparent to those skilled in the art from a consideration of the following detailed description of an exemplary specific embodiment thereof, had in conjunction with the accompanying drawing which is a schematic presentation of this embodiment.

Referring to the drawing, the counter there illustrated comprises four identical binary stages 10, 20, 30, and 40. Binary stage 10 comprises two arms in electrical parallel relationship between an A.C. bias source 61 and ground 62. One arm includes the electrical series elements of resistor 17 and electroluminescent cell or capacitor 11, and the other arm includes the electrical series elements of resistor 18 and electroluminescent cell or capacitor 12. In addition photoconductor 14 is connected in electrical parallel relationship with cell 11 with respect to the bias source 61, and is optically coupled to call 12. Correspondingly, photoconductor 13 is connected in electrical parallel relationship with cell 12 with respect to the bias source 61, and is optically coupled to cell 11. The network thus far described for stage 10 constitutes a flip-flop circuit, as will become apparent from the subsequent description of its operation. In order to introduce a prescribed or planned asymmetry into this flip-flop circuit, a resistor 15 is connected across cell 12.

Thus, with regard to stage 10, when the bias voltage 61 is initially applied to the circuit, as by closing switch 63, stage 10 assumes the stable state of cell 11 luminant and cell 12 extinguished. This result is accomplished by choosing the parameters of the circuit so that when switch 63 is initially closed, the voltages across cells 11 and 12 from the bias source 61 are both in excess of their threshold values. However, because of the unbalance caused by resistor 15, the voltage across cell 11 is greater than that across cell 12, hence cell 11 luminesces more brilliantly than cell 12. As these cells 11 and 12 luminesce, their respective optical couplings with photoconductors 13 and 14 cause the resistances of these photoconductors to decrease. Since cell 11 is luminescing more brilliantly than cell 12, photoconductor 13 tends to decrease to a lower resistance and faster than photoconductor 14. As a result, the decrease in resistance of photoconductor 13 causes the voltage applied across cell 12 to drop below its threshold value, and cell 12 becomes non-luminant. The optical coupling between cell 12 and photoconductor 14 initially has a similar effect on cell 11, but since cell 11 starts from a more brilliant or higher voltage condition than cell 12, cell 11 does not become extinguished and the stage 10 soon reaches the stable state of cell 11 luminant and cell 12 non-luminant or extinguished. With cell 12 extinguished, photoconductor 14 soon attains its full impedance value, and cell 11 attains its full luminance under the bias voltage. This stable state of the binary stage 10 is identified as the "0" state.

Each of the stages 20, 30, and 40 are identical to stage 10, both in structure and response to the bias voltage. Therefore the structure and response of these stages is apparent from the foregoing, and will not be specifically described.

The input of pulses to be counted by the counter is effected through input terminals 60. An input pulse at 60 is applied to stage 10 across resistor 16. Considering stage 10 to be in the stable state "0" above-defined, cell 11 is luminant and illuminating photoconductor 13, while cell 12 is non-luminant and hence photoconductor 14 is not illuminated. Photoconductor 13 is therefore a relatively low impedance and photoconductor 14 is a relatively high impedance. Since the input pulse is coupled to each of said cells through its respective photoconductor in electrical series with it with respect to the input source (series circuit 60, 13, 12, to ground, and series circuit 60, 14, 11, to ground), a much greater voltage from the input pulse is passed by photoconductor 13 and applied across cell 12 than is passed by photoconductor 14 and applied across cell 11. The input pulse should be of sufficient value to render cell 12 substantially more luminant than cell 11. The duration of this input pulse is timed in accordance with the time characteristics of the photoconductors, to terminate at a time that renders photoconductor 14 more conductive than photoconductor 13 as a result of the input pulse. This residual unbalance in the flip-flop circuit overrides the unbalance due to resistor 15, and results in a dominant luminance of cell 12 over cell 11, and the establishment of stable state "1" in stage 10, with cell 12 fully luminant from the bias source 61 and cell 11 extinguished, it being shunted by the low impedance of the illuminated photoconductor 14. Similarly, if stage 10 is in the "1" state with cell 12 luminant and cell 11 non-luminant, from the foregoing it is apparent that upon the application of an input pulse at 60 the stage is caused to switch to the "0" state with cell 11 luminant and cell 12 extinguished.

The transfer, carry, or coupling circuit 19 between stage 10 and stage 20 comprises the photoconductors 19*a* and 19*b* connected in electrical series with each other and with the input resistor 26 for stage 20, with respect to the bias voltage source 61. Carry circuit 19 further includes the electroluminescent cell 19*c* connected across the input resistor 16 of stage 10. Photoconductor 19*a* is optically coupled to cell 12, and photoconductor 19*b* is optically coupled to cell 19*c*. Photoconductors 19*a* and 19*b* are chosen of such characteristics that the voltage across stage 20 input resistor 26 is insufficient to cause a switch in state of stage 20 unless both photoconductors are simultaneously of low impedance as is effected in the manner described below.

Thus, every input pulse in at 60 causes cell 19*c* to luminesce. However, if at the time of a given input pulse at 60 stage 10 is in the "0" state, although cell 12 immediately becomes luminant as stage 10 switches to the "1" state, and although cell 19*c* luminesces as a result of said input pulse, the resistance time response of the series photoconductors 19*a* and 19*b* is such that insufficient voltage is applied across resistor 26 to switch stage 20 before the input pulse at 60 terminates and cell 19*c* becomes extinguished. This result is preferably obtained by making the time response of photoconductor 19*a* relatively slow. On the other hand, if stage 10 is in the "1" state for a length of time sufficient to render photoconductor 19*a* relatively fully conductive, then when the next input pulse at 60 switches stage 10 to the "0" state and excites cell 19*c*, the residual conductivity of photoconductor 19*a* and the relatively fast response of photoconductor 19*b* results in a voltage across input resistor 26 from the bias source 61 which is sufficient to cause stage 20 to switch states and cell 29*c* to luminesce, in the same manner as such result is effected in stage 10 by the input pulse at 60. After the input pulse at 60 has passed and series resistance of photoconductors 19*a* and 19*b* has increased sufficiently, cell 29*c* is extinguished. Since carry circuits 29, 39, and 49 are identical to carry circuit 19, it is apparent that they function in the same manner. These carry circuits are all connected in the counter in electrical parallel relationship to each other with respect to the bias source, and are otherwise electrically isolated from each other.

Thus, with a plurality of identical flip-flop binary stages 10, 20, 30, and 40, each similarly connected to a bias voltage source 61, the initial condition of each stage, as determined by the planned asymmetry effected by resistors 15, 25, 35, and 45, is established in the stable "0" state with cells 11, 21, 31, and 41 luminant, and cells 12, 22, 32, and 42 non-luminant. The first input pulse at 60 is coupled through photoconductors 13 and 14 to cells 12 and 11 respectively, causing stage 10 to switch from "0" state to "1" state. Since photoconductor 19*a* had not been previously illuminated, the input pulse is not effectively coupled by carry circuit 19 to stage 20. With the resultant prolonged illumination of photoconductor 19*a* by cell 12, when the second input pulse at 60 excites cell 19*c* to illuminate photoconductor 19*b*, an input pulse is effectively applied to stage 20, but not beyond stage 20, due to the high impedance of photoconductor 29*a*. This second pulse therefore causes stages 10 and 20 to shift states, resulting in stage 10 going to the "0" state and stage 20 going to the "1" state. Photoconductor 19*a* being non-illuminated at this time, the third pulse in at 60 is effectively applied only to stage 10 and is not carried beyond this stage, causing stage 10 to return to the "1" state. With stages 10 and 20 both in the "1" state, photoconductors 19*a* and 29*a* are both illuminated, hence the fourth pulse in at 60 is applied to stage 10, where illumination of photoconductor 19*b* by cell 19*c* effectively carries an input pulse to stage 20, and where illumination of photoconductor 29*b* by cell 29*c* effectively carries an input pulse to the input resistor 36 of stage 30, causing stages 10 and 20 both to switch from "1" states to "0" states, and causing stage 30 to switch to the "1" state. The fifth pulse in at 60 causes stage 10 to switch from the "0" to the "1" state, and will not affect any of the other stages because photoconductor 19*a* was not illuminated while stage 10 was in the "0" state. The further response of the present circuit to continued input pulses at 60 will be apparent ot those skilled in the art from the foregoing description, the result being the same as in conventional binary scalers, and the count of pulses applied to the circuit through input 60 and as appropriately coupled to input resistors 16, 26, 36, and 46 being indicated in binary notation by the luminance condition of the stage cells 11–12, 21–22, 31–32, and 41–42.

The illustrated counter is provided with four stages, 10, 20, 30, and 40. It is understood, however, that any desired number of stages could be employed to provide any feasible count capacity. This may be effected by adding additional stages to the output 72 as embodied in the carry circuit 49. As is apparent, the counter may at any time be reset to a zero count by opening switch 63 long enough to enable all the elements to reach a stable non-energized condition. Upon reclosing of switch 63, each stage assumes its "0" state as previously described.

Accordingly, by the present invention there is provided a counter, comprised of variable light source-photoresponsive element couples, wherein the counter is of the binary scaler type, having a plurality of binary flip-flop stages, with carry or coupling circuits interrelating the several stages, to provide a count in binary notation of the number of pulses applied to the input of the counter. Having presented one specific exemplary embodiment of the invention, it is understood that the scope of the invention is not ilimted thereto, for changes, modifications, and variations will be apparent to those skilled in the art. And such changes, modifications, and variations as are embraced by the spirit and scope of the appended claims are contemplated as within the purvue of the present invention.

What is claimed is:

1. A binary scaler comprising a plurality of stages; each stage including a bi-stable circuit cyclically operable between a first and a second stable state, and an input means for each said circuit; means for coupling an energizing voltage source across each of said bi-stable circuits; and a carry means in combination with each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically across said other of said sources and being optically coupled to said one of said sources; said input means comprising means for applying an input signal simultaneously across said one element and said one source in electrical series with respect thereto, and across said other element and said other source in electrical series with respect thereto; said light sources and photoresponsive elements of each said circuit cooperating in response to successive input signals applied to the respective input means to effect said cyclical operation, one cycle of operation for each pair of input signals applied to said respective input means; said first and second stable states being defined by different states of said light sources; and each said carry means including photoresponsive means optically coupled with said other of said light sources of the earlier or its respective two stages for coupling an input signal to the input means of the later of its respective two stages along with the application of an input signal to the input means of said earlier stage, only when said earlier stage is in said second stable state at the time of application of the last-mentioned input signal; each said carry means photoresponsive means being connected in electrical parallel and otherwise electrically isolated relationship with each other with respect to said energizing voltage coupling means.

2. A binary scaler as set forth in claim 1, and further including a voltage responsive variable light source in combination with each said carry means photoresponsive means responsive to the signal applied to the circuit input means of the eariler of its respective two stages, each said carry means photoresponsive means being optically coupled with the respective last-mentioned light source.

3. A binary scaler as set forth in claim 2, and further including an input means for the scaler associated with the circuit input means of the first stage of the scaler.

References Cited by the Examiner

UNITED STATES PATENTS

| | | | |
|---|---|---|---|
| 2,727,683 | 12/55 | Allen et al. | 250—209 X |
| 2,900,522 | 8/59 | Reis | 250—213 X |
| 2,985,763 | 5/61 | Ress | 250—208 |
| 3,107,301 | 10/63 | Willard | 250—214 X |

RALPH G. NILSON, *Primary Examiner.*

RICHARD M. WOOD, *Examiner.*